United States Patent [19]

Mendia et al.

[11] Patent Number: 5,513,799
[45] Date of Patent: May 7, 1996

[54] DIVERGENT MASTER PETAL FOR ORIENTABLE NOZZLES OF VARIABLE GEOMETRY INTENDED FOR GAS TURBINE ENGINES

[75] Inventors: J. Ignacio I. Mendia; Jose R. Urruela, both of Vizcaya, Spain

[73] Assignee: Sener, Ingenieria, Y Sistemas, S.A., Spain

[21] Appl. No.: 232,706

[22] Filed: Apr. 25, 1994

[30] Foreign Application Priority Data

Sep. 21, 1993 [ES] Spain ................... 9301991

[51] Int. Cl.⁶ .................................................. B64C 9/38
[52] U.S. Cl. ...................................................... 239/265.41
[58] Field of Search .................... 239/265.19–265.43; 60/271, 232

[56] References Cited

U.S. PATENT DOCUMENTS

| | | | |
|---|---|---|---|
| 4,022,948 | 5/1977 | Smith et al. | 239/265.39 X |
| 4,128,208 | 12/1978 | Ryan et al. | 239/265.31 |
| 4,171,093 | 10/1979 | Honeycutt et al. | 239/265.39 X |
| 4,219,156 | 8/1980 | Schwaerzler | 239/265.35 |
| 4,363,445 | 12/1982 | Bouiller et al. | 239/265.35 |
| 4,508,270 | 4/1985 | Joubert | 239/265.35 |
| 4,637,550 | 1/1987 | Nash | 239/265.37 |
| 5,076,496 | 12/1991 | Lippmeier . | |

FOREIGN PATENT DOCUMENTS

| | | |
|---|---|---|
| 2657922 | 1/1991 | France . |
| 1466874 | 11/1973 | United Kingdom . |
| 2132279 | 12/1983 | United Kingdom . |
| 2230299 | 10/1990 | United Kingdom . |
| 0557229 | 2/1992 | United Kingdom . |

*Primary Examiner*—Andres Kashnikow
*Assistant Examiner*—Kevin Weldon
*Attorney, Agent, or Firm*—Ostrolenk, Faber, Gerb & Soffen

[57] ABSTRACT

A divergent master petal for orientable nozzles of variable geometry intended for gas turbine engines, which is connected by means of articulations to the convergent master petal (4) and to a bar (12) which connects the master petal to the control mechanism. The inner surface (5c) of the divergent master petal (5), which is in contact with the flow of gases, is of variable shape between a substantially straight cross section coinciding with or close to the upstream transverse edge and a convexly curved cross section coinciding with or next to its downstream end transverse edge, with the convexity directed towards the inside of the engine.

4 Claims, 12 Drawing Sheets

DIVERGENT MASTER PETAL FOR ORIENTABLE NOZZLES OF VARIABLE GEOMETRY INTENDED FOR GAS TURBINE ENGINES

BACKGROUND OF THE INVENTION

The present invention refers to a master petal for the divergent zone of a convergent-divergent nozzle of variable geometry capable of orienting the flow of gas for a gas turbine engine, used as means of propulsion in aviation.

More specifically, in a preferred application, the nozzle to which the present invention relates is of the axisymmetric type comprising a convergent zone followed, in the direction of flow, by a divergent zone, both of which are formed by master petals connected to each other by articulations and slave petals, also connected together by articulations. The convergent zone, which is also of variable geometry, may be actuated so as to direct the flow of gas and therefore the thrust in any direction on a cone directed around the longitudinal axis of the engine.

Maneuverability of airplanes is essential. Maneuverability has been obtained up to now by aerodynamic forces, but it can be substantially improved by changing the orientation of the flow from its normal axial direction of actuation.

Orienting the flow of gas has been used for many years in rocket engines. In those engines, the systems are much simpler, since their nozzles are of constant geometry.

Convergent-divergent nozzles of variable geometry have relatively recently been introduced in supersonic airplanes driven by turbojet or turboprop engines. In this class of nozzles, systems for orienting the flow are still not in an operating phase. Those of the two-dimensional type in which the flow is directed only in one plane are in a more advanced state.

It is of particular advantage to orient the flow in nozzles with axial symmetry since the direction of the flow can then be varied in any axial plane, with the pitch and yaw planes being particularly important.

Various prior patents cover mechanisms for orienting the flow in this type of nozzle, since it is theoretically possible to effect it in various ways, although it is very difficult for the mechanisms not to have a high degree of complexity.

To orient only the divergent zone of the nozzle downstream of the A8 throat area has the advantage that the disturbances induced by the orientation are not transmitted upstream of the engine and that the sealing of the spaces between the different moving parts is simplified. There still remains the problem of the seal between divergent master petals during the orienting of the flow. With regard to this, reference should be had to U.S. patent application Ser. No. 336,369 of 1989 U.S. Pat. No. 4,994,660 and to Spanish Application No. 9200369 of 1992, which disclose different embodiments of nozzles in which only the divergent zone or a part of it respectively is oriented.

In order to seal the spaces between divergent master petals, various solutions are suggested in U.S. patent application Ser. Nos. 804,021 of 1985 now abandoned, 804,022 of 1985 now abandoned, 336,380 of 1989 now abandoned, and 07/475,465 of 1991 now U. S. Pat Ser. No. 5076996, and Spanish Applications Nos. 9,200,369 and 9,202,157 of 1992.

Spanish Patent Application 9,202,157 describes a concept of a divergent slave petal for sealing the longitudinal space between contiguous divergent master petals. The geometry of the longitudinal spaces between divergent master petals is changed during the orientation of the flow, changing from an approximately rectangular shape to that of an adjusted surface, the sides of which are no longer parallel.

Spanish Patent Application No. 9200369 of 1992 describes an orientable axisymmetric nozzle of variable geometry for gas turbine engines. That nozzle includes a convergent zone and a divergent zone, which are both formed of master petals and slave petals, and it includes control and outer radial support means for regulating the throat area and control means for regulating the orientation of the flow. Its novel feature is the fact that the variation of the A8 throat area and the orientation of the flow are effected by a single control system which is formed of three annular parts which are concentric to each other and to the axis of the engine, and of a plurality of linear actuators articulated at their upstream end to the structure of the engine.

The annular parts are connected to each other and to the structure of the engine by articulation elements and guide devices. Those permit the joint axial displacement of the three annular parts by the same amount with respect to the structure of the engine, and permit movement of relative rotation of the intermediate and outer annular parts with respect to each other and with respect to the inner annular part. This permits the inclination of the external annular part in any direction, with the center of rotation on the axis of the engine.

The convergent master petals are connected at their upstream ends to the inner annular part by tangential cylindrical articulations, the axes of which are perpendicular to the axis of the engine. The outer annular part, in turn, is connected by spherical articulations to the downstream end of the linear actuators.

The mechanism for variation of the A8 throat area is formed of a connecting rod which is connected at one end by an articulation to the convergent master petal, while at the opposite end it is connected by another articulation to the fixed structure of the cover of the nozzle.

The master petals of the divergent zone are subdivided transversely into two sections which are connected together by a cylindrical articulation, having an axis which is perpendicular to the axis of articulation between master petals of the convergent and divergent zones. The downstream section is connected to the outer annular part by a bar which is connected to that section by a spherical articulation and to the outer annular part by a tangential cylindrical articulation and the axis of the latter articulation is perpendicular to that of the engine.

The upstream section of the divergent master petal is connected, at its upstream end, to the corresponding convergent master petal by a tangential cylindrical articulation which has an axis that is perpendicular to the axis of the engine.

The outer annular part is formed of two ring segments which are interconnected with articulations and are supported by four linear actuators. This embodiment formed of two half rings moved by four linear actuators makes it possible to vary the A9 exit area for a fixed value of the A8 throat area.

Spanish Patent Application No. 9202157 of 1992 proposes converting every divergent slave petal into a deformable structural unit of minimum stiffness in torsion, formed of a base plate and a plurality of discrete transverse elements inserted in the base plate. The base plate imparts axial stiffness to the unit, serving as element for bearing the axial forces due to the flow of gas, the cooling air and the inertia forces, but presenting minimum capacity for transmitting transverse forces. On their part, the discrete transverse elements lack an ability to transmit torsion, but they do transmit the transverse forces and the shearing forces imposed both by the flow of gas and by the divergent master petals to which the gas pressure exerted on the base plate bearing the axial forces is transmitted.

Thus, Spanish Patent Applications 9200369 and 9202157 of 1992 disclose a mechanism capable of orienting the flow of gas by acting solely on a part of the divergent zone of the nozzle with suitable sealing of the longitudinal space between contiguous divergent master petals. The present invention describes and claims a divergent master petal which makes it possible to increase the maximum angle of orientation of the flow over that which is obtainable with the embodiment in Spanish Patent Application No. 9200369.

In orienting the divergent zone of the nozzle, the divergent master petals, as described in Spanish Patent Application No. 9200369, are forced to move in radial and tangential directions with respect to the central axis of the engine. The maximum angle of orientation of the divergent zone for a given A8 throat area is limited by the interferences between master and slave petals in zones near the outlet area A9. As indicated previously, Spanish Patent Application 9202157 of 1992 proposes converting the divergent slave petal into a deformable structural unit of minimum stiffness in torsion, formed by a base plate bearing the axial forces and with minimum capacity to transmit transverse forces. The base plate includes discrete transverse elements with capacity to transmit the transverse forces and the shearing forces imposed both by the flow of gas and by the divergent master petals. If the inner surface, in contact with the flow of gas, of the divergent master petals is flat, the maximum angle of orientation of the flow is determined by interference in zones close to the A9 exit area of the inner surface with the discrete transverse elements because in this case, the longitudinal edges of the base plate do not rest on the inner surface of the divergent master petals, a longitudinal opening appearing which permits the passage of the gases to the outside.

SUMMARY OF THE INVENTION

In order to solve this problem, there is proposed, in accordance with the present invention, a divergent master petal which has an inner surface, which is in contact with the flow of gas and is of a shape that is variable between two transverse sections, one of them straight, so as to coincide with or be close to the upstream transverse edge of the petal, and the other one curves convexly so as to coincide with or be close to the downstream extreme transverse edge of the petal, the convexity of its curvature being directed toward the inside of the engine.

The characteristics set forth are applicable both to master petals formed of a single rigid segment and to master petals formed of two or more rigid segments which are connected to each other by cylindrical articulations. In the second case, the upstream end of the master petal could have an inner surface, in contact with the flow of gas, which is of flat shape or else of variable shape continuing the curvature of the downstream section or sections.

The transmission between the two sections is effected gradually and smoothly in order to permit the continuous contact of the divergent slave with the inner surface.

To adopt for the divergent slave petal of Spanish Patent Application 9202157 an inner surface defined by a straight cross section in the zone of the A8 throat area and a curved and convex cross section with respect to the axis of the engine in the zone of the A9 exit area, as proposed in some of the previously mentioned patents, presupposes considerably increasing the stiffness in torsion of the divergent slave petal with a resulting large loss of efficiency in the sealing of the space present between contiguous divergent master petals during the orienting of the flow as a result of the distortion produced by the temperature gradients.

All of the above features and objects, as well as others specific to the invention, are explained in the following description, to be read with reference to the accompanying drawings, which show one possible embodiment, given by way of illustration and not of limitation.

DESCRIPTION OF THE PREFERRED EMBODIMENT

FIGS. 1 to 5 show a nozzle formed in accordance with one of the embodiments disclosed in Spanish Patent Application 9200369 of 1992 and modified with the invention. Therefore, FIGS. 1 to 4 include an embodiment of the divergent master petal of the present invention.

Figure 1:
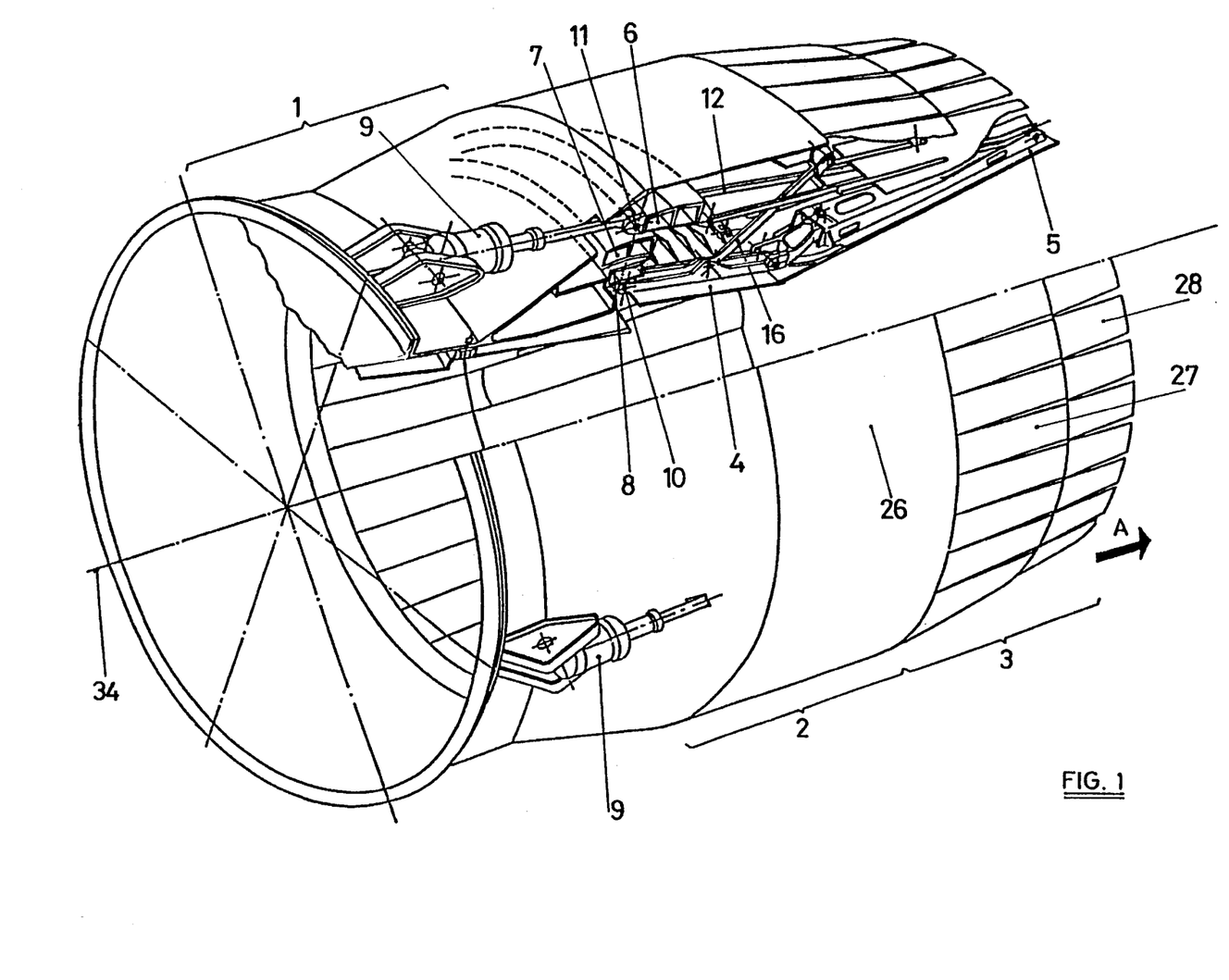
FIG. 1 is a perspective view partially in section, of an orientable nozzle developed in accordance with the invention

FIG. 1 is a schematic perspective view, partially in section, of the nozzle. The arrow A indicates the direction of flow or circulation of the gases. Like traditional nozzles, the nozzle in FIG. 1 includes a rear casing 1, a convergent zone 2, and a divergent zone 3. The convergent zone 2 is formed from a plurality of master petals 4 and slave petals, not shown. In the same way, the divergent zone 3 is formed with a base of master petals 5 and slave petals, not shown. The nozzle also includes a control system for the A8 throat area, shown in FIG. 3. That throat area is defined by the intersection between the convergent petals 4 and the divergent petals 5, and is for orienting the flow.

Varying the A8 throat area and orienting the flow are effected by a single control system, which is formed of three annular parts 6, 7 and 8 which are concentric with the axis 34 of the engine, and by a plurality of linear actuators 9 which are articulated at their upstream ends to the structure of the casing 1.

The convergent master petals 4 are connected, at their upstream ends, to the inner annular part 8 at tangential cylindrical articulations 10, the axes of which are perpendicular to the axis 34 of the engine.

Figures 2, 2A:
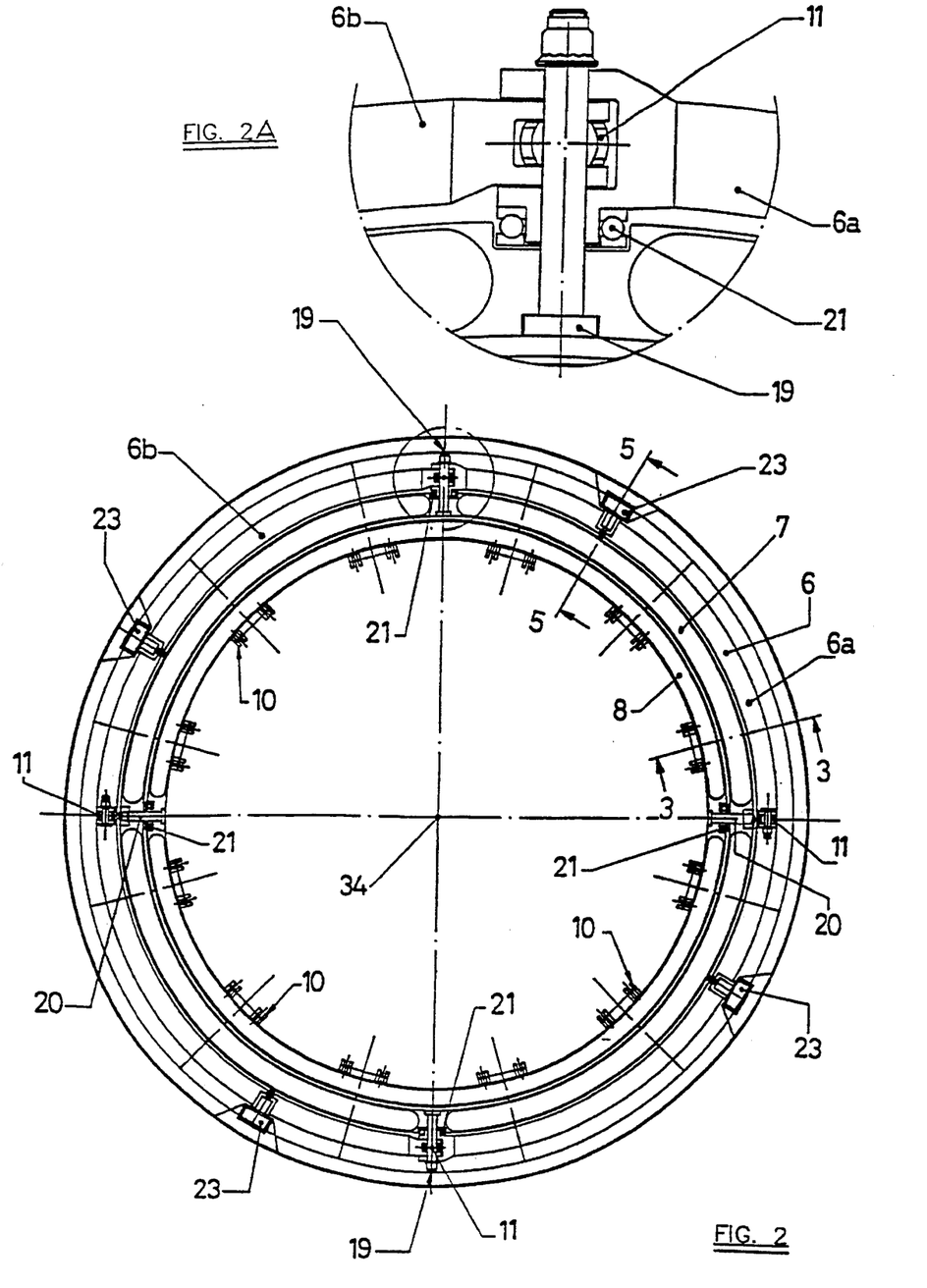
FIG. 2 is a cross section through the nozzle along the section 2—2 of FIG. 5, showing the connections between the elements which form the system for the simultaneous control of the throat area and the orientation of the flow.
FIG. 2a is a detail of FIG. 2.

The downstream ends of the linear actuators 9 10 are connected to the outer annular part 6 by spherical articulations 11 (FIGS. 1 and 2). Furthermore, the outer annular part 6 is connected to the divergent master petals 5 by bars 12 which are mounted concentrically around the axis 34 of the engine. Each bar 12 is connected to the outer annular part 6 by a cylindrical articulation 13, while the connection to the divergent master petal 5 is effected by means of a spherical articulation 14 (FIGS. 1 and 3).

Figure 3:
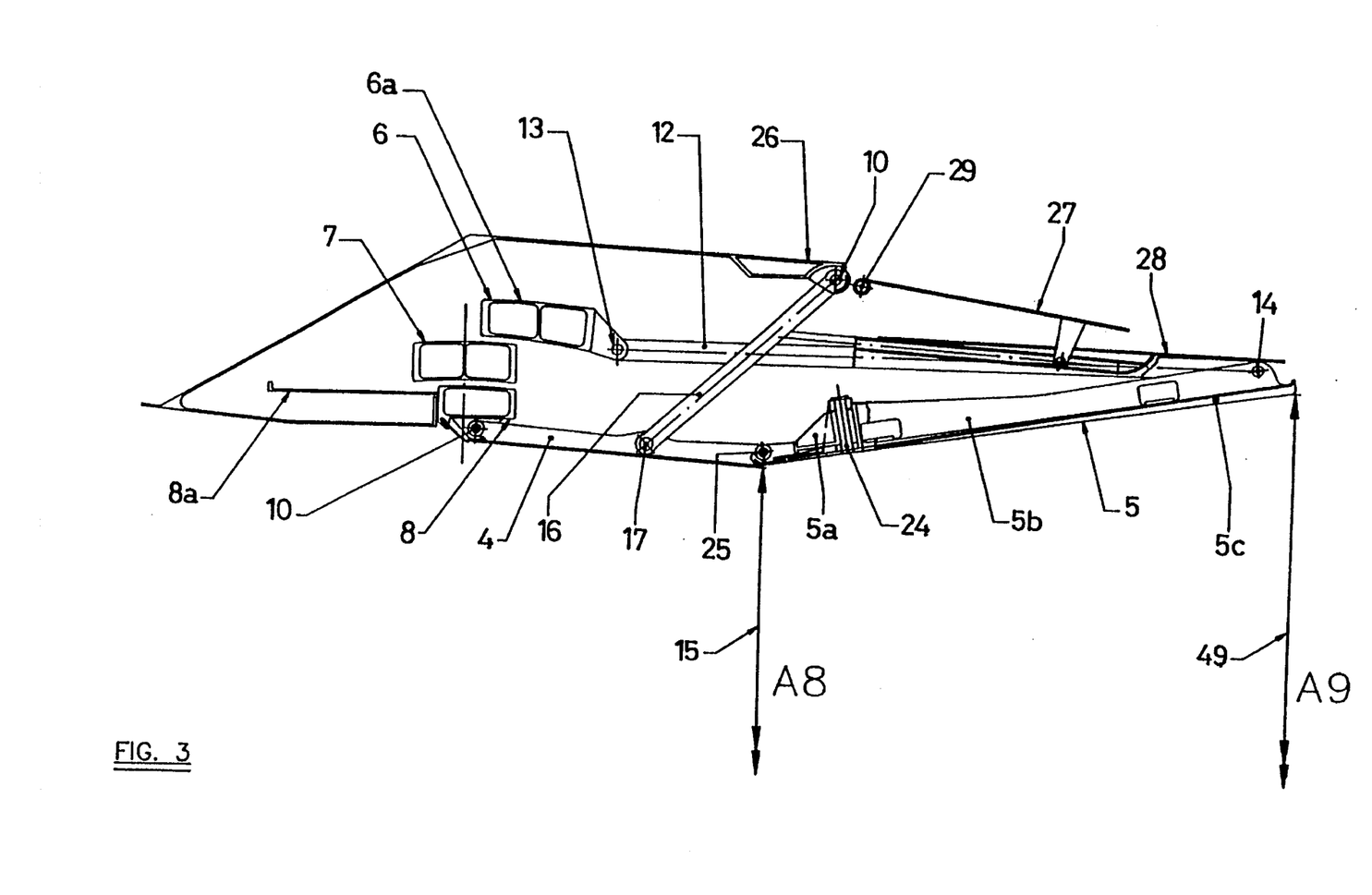
FIG. 3 is a longitudinal section through the nozzle along the section line 3—3 of FIG. 2, showing the nozzle in open position without orientation of the flow.

The control system of the nozzle includes, furthermore, a mechanism for modifying the A8 throat area designated by the numeral 15, which, as shown in FIG. 3, is formed of a connecting rod 16 which is connected at one end by an articulation 17 to the convergent master petal 4, while at its opposite end it is connected by an articulation 18 to the fixed structure of the cover of the nozzle.

The annular parts 6, 7 and 8 are furthermore connected to each other by devices which permit the axial displacement of the group of three parts, by an equal amount, with respect to the structure of the engine, as well as a movement of relative rotation of the intermediate annular part 7 and the outer part 6 between themselves and with respect to the inner annular part 8, so as to permit the inclination of the outer annular part 6 in any direction with respect to a center of rotation on the axis 34 of the engine. In this way, the outer annular part 6 and inner annular part 8 are permitted to carry out between themselves, through the intermediate annular part 7, a relative movement of rotation in space, defining a spherical connection. For this, the annular parts 6 and 7 are connected together by a cylindrical articulation, defined by a pair of shafts 19, as shown in FIG. 2, which are aligned in diametrically opposite positions, while the annular parts 7 and 8 are connected to each other by another cylindrical articulation defined by a pair of shafts 20, which are also aligned with each other diametrically, in positions perpendicular to the shafts 19.

In order to reduce the play between the annular parts 6, 7 and 8 and minimize the rubbing between them during their relative rotation, axial thrust bearings, designated 21 in FIG. 2, are arranged concentrically to the shafts 19 and 20.

Figure 4:
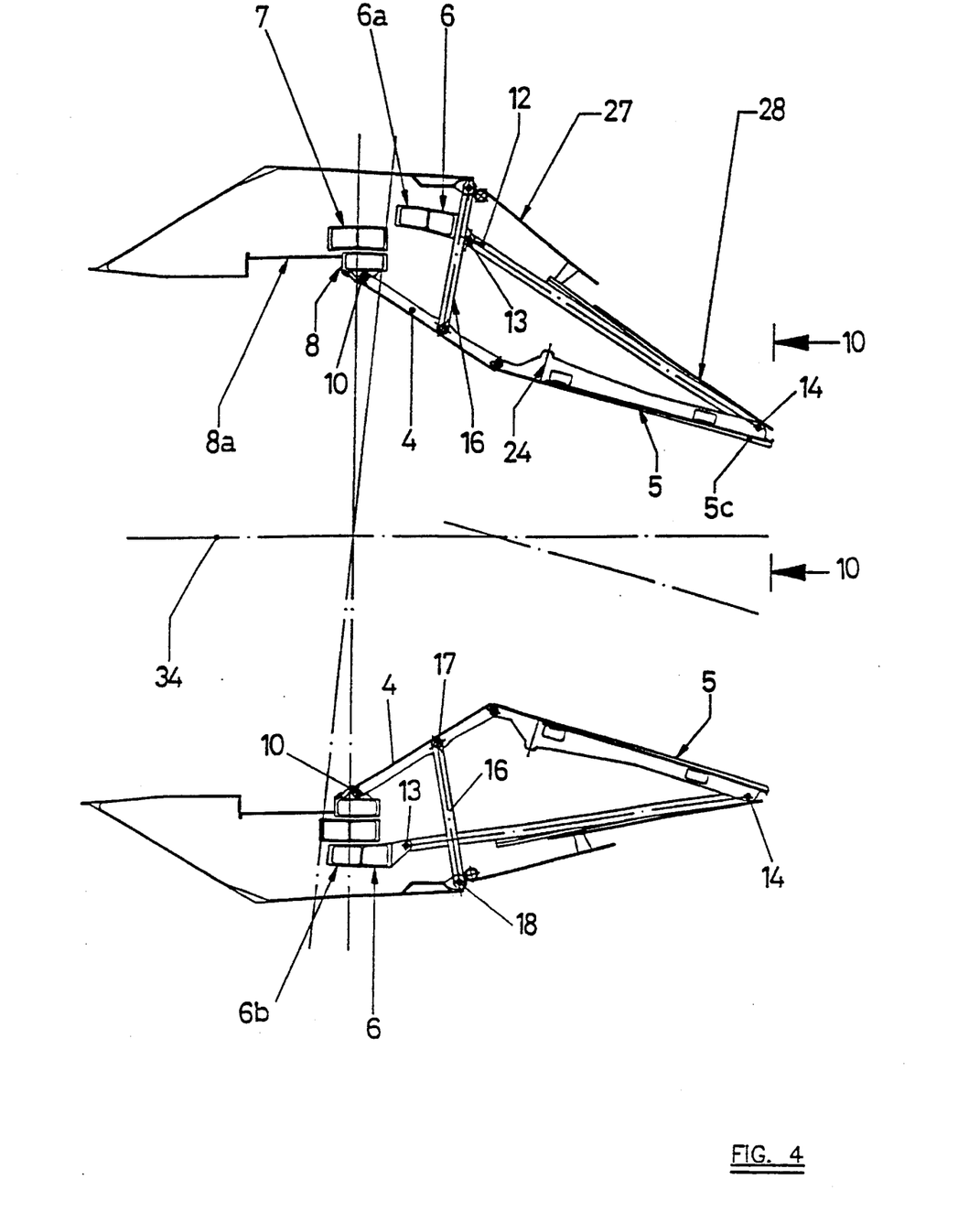
FIG. 4 is a longitudinal section through the nozzle along the section 3—3 of FIG. 2, with the nozzle in closed position with orientation of the flow.
Figure 5:
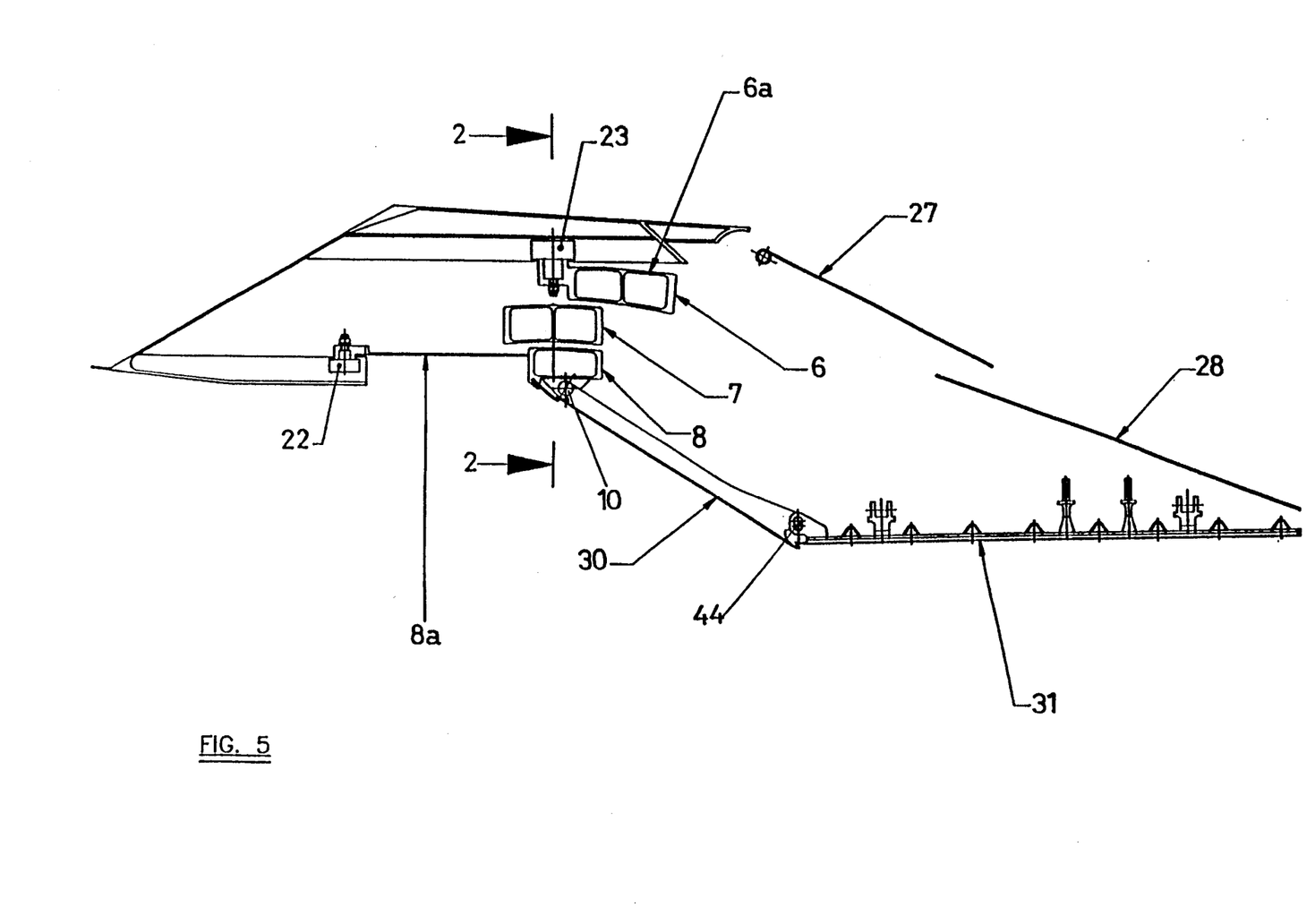
FIG. 5 is a longitudinal section through the nozzle along the section 5—5 of FIG. 2, with the nozzle in closed position and without orientation of the flow.

As can be seen from FIGS. 3 to 5, the annular part 8 has a cylindrical extension 8a, for sealing the "post-combustor" during the adjustment of the throat area 15 of the nozzle. The axis of this cylindrical extension must be located at all times on the longitudinal axis 34 of the engine. In order to define a guide device for the annular part 8 for this purpose, the rollers 22 (FIG. 5) are arranged outside the plane of the spherical joint so as to move only in an axial direction on the inside of guides fastened to the structure of the engine.

Similarly, the annular part 6 is guided by a guide device formed by rollers 23, FIGS. 2 and 5, which can move only in an axial direction within guides fastened to the structure, with a small clearance in order to permit the rotation of the annular part 6 on any diameter. The guides of the annular parts 6 and 8 absorb the net shear forces which appear during the orientation of the flow and those due to asymmetries of the loads.

The arrangement described, shown in FIGS. 1 to 5, permits the following movements by activation in one or the other direction of the linear actuators 9:

Axial movement of the assembly of annular parts 6, 7 and 8, together with the bars 12, and the petals 4, making it possible to vary the A8 throat area, indicated as 15 in FIG. 3. This displacement of the annular parts 6, 7 and 8 by the action of the linear actuators 9 causes the radial displacement of the convergent master petals 4 via the articulation 10. The convergent master petals 4, due to the fixed structure and by means of the connecting rod 16, open or close in a radial direction, defining, together with the bars 12, the position of the divergent master petals 5. In this case, the linear actuators 9 will always have the same length.

Figure 12:
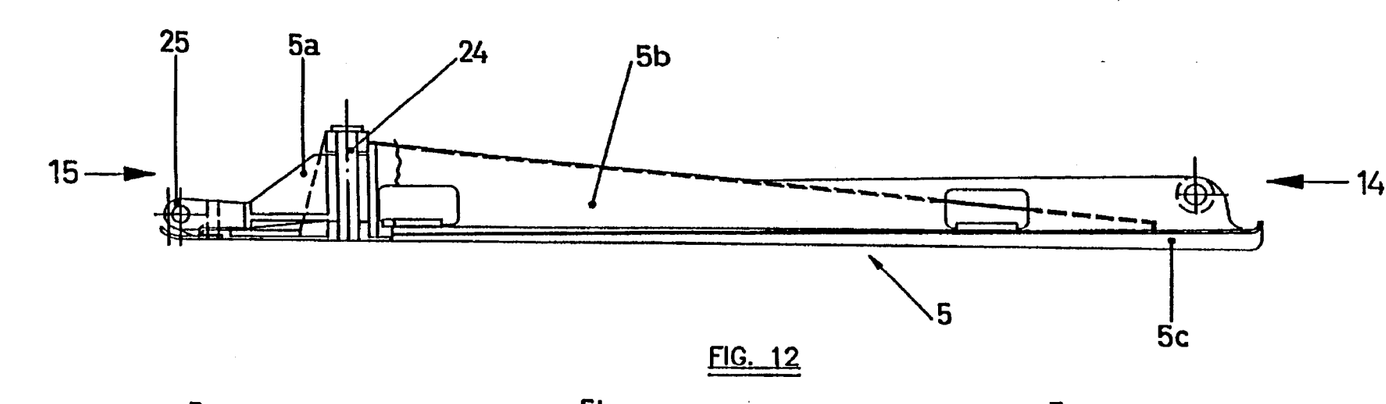
FIG. 12 is a side elevation of a divergent master petal according to the invention.
Figure 13:
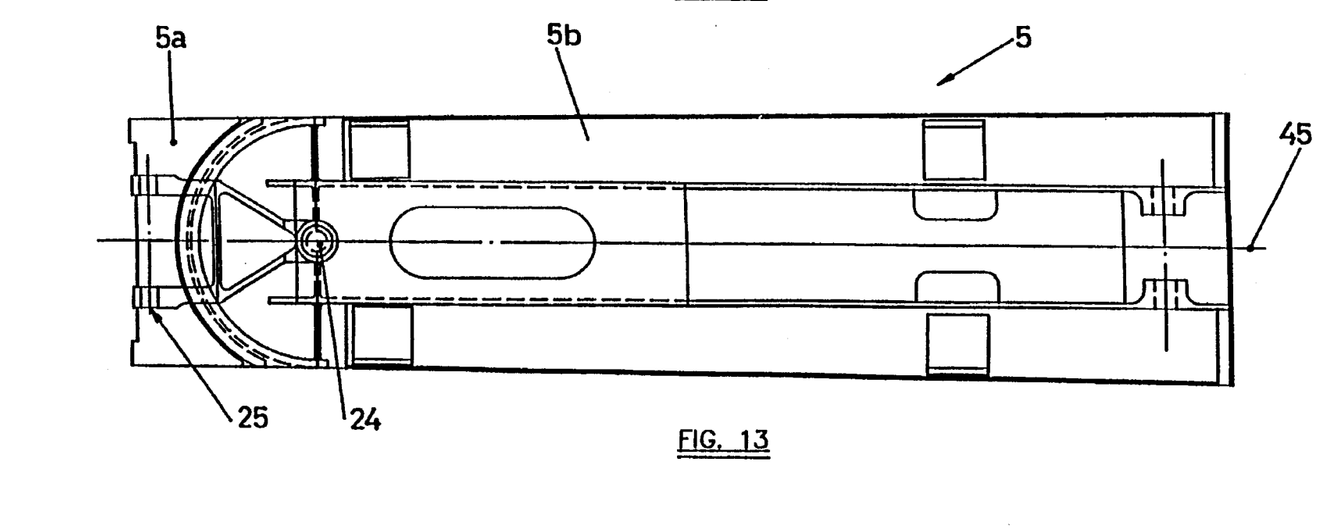
FIG. 13 is a plan view of the divergent master petal of FIG. 12.

Each of the actuators 9 can be lengthened or shortened so that the outer annular part 6 is moved over a theoretical spherical surface, centered on the axis 34 of the engine, the annular part 8 remaining fixed in axial position and there then being obtained, through the same mechanisms, the orientation of the flow in any direction around the axis 34 of the engine. In the actuation indicated, the bars 12, which are connected by the cylindrical articulation 13 to the annular part 6, turn with the latter and cause the divergent master petals 5 to move in a radial direction, which movement is indicated by the arrow R in FIGS. 10 and 11, and in tangential direction, which movement is indicated by the arrow T in these same FIGS. 10 and 11, thus making it possible to obtain the orientation of the flow in the direction indicated by the arrow B. For this purpose, each divergent master petal is subdivided into two segments, designated by the numerals 5a and 5b, connected together by a cylindrical articulation 24 arranged in a direction perpendicular to the center line of the base of the petal 5, as can be better noted from FIGS. 3, 6 and 7. The element or segment 5a is connected by a cylindrical articulation 25 to the master petal 4, as seen in FIGS. 3, 12 and 13. This arrangement provided a very simple solution to the problem of sealing in the throat area 15, since, during the orientation of the flow, both segments 5a and 5b move in a radial direction, but the element 5a is prevented from moving in a tangential direction, the element 5b alone moving in the tangential direction. As a result, a desired orientation of the flow of gas and therefore of the thrust is obtained.

The annular part 6 is divided diametrically into two half rings, indicated by the numerals 6a and 6, which are connected to each other by the cylindrical articulations 19, as can be noted from FIG. 2. The linear actuators 9, which are connected to the cylindrical articulations 19, will remain fixed in length, those which are fastened to the center point of the half rings 6a and 6b being shortened or lengthened to the same extent in order to vary the A9 exit area of the nozzle, for a given A8 throat area 15, since the bars 14 open or close the divergent master petals 5.

The three possibilities of movement mentioned previously can be realized simultaneously, by suitably regulating the stroke of the linear actuators 9.

Returning to FIG. 1, the nozzle includes, around the convergent zone 2, a cover 26 and, around the divergent zone, a cover formed of elements 27 and 28. As shown in FIGS. 3 and 4, the elements 27 are connected by spherical articulations 29 to the fixed structure and are guided by the bars 12, while the elements 28 are connected to the bars 12.

In FIG. 3, the nozzle is shown in open position and without orientation of the flow, while in FIG. 4 the same longitudinal section of the nozzle is shown but in closed position and with orientation of the flow.

In FIG. 5, which shows the nozzle in closed position without orientation of the flow, there are shown the wheels or rollers 22 and 23 which are displaceable on longitudinal guides to effect the axial displacement of the annular parts 6, 7 and 8.

The seal between the convergent master petals 4 and between divergent master petals 5 is produced by the corresponding convergent slave petals 30 and divergent slave petals 31, as shown in FIGS. 5 to 11.

In order to be adapted to the divergent master petals 5, formed of the segments 5a and 5b, and solve the problem of the sealing of the space present between contiguous divergent master petals 5, Spanish Patent Application No. 9202157 proposes a divergent slave petal 31 which constitutes a deformable structural unit of minimum stiffness in torsion.

Figure 6:
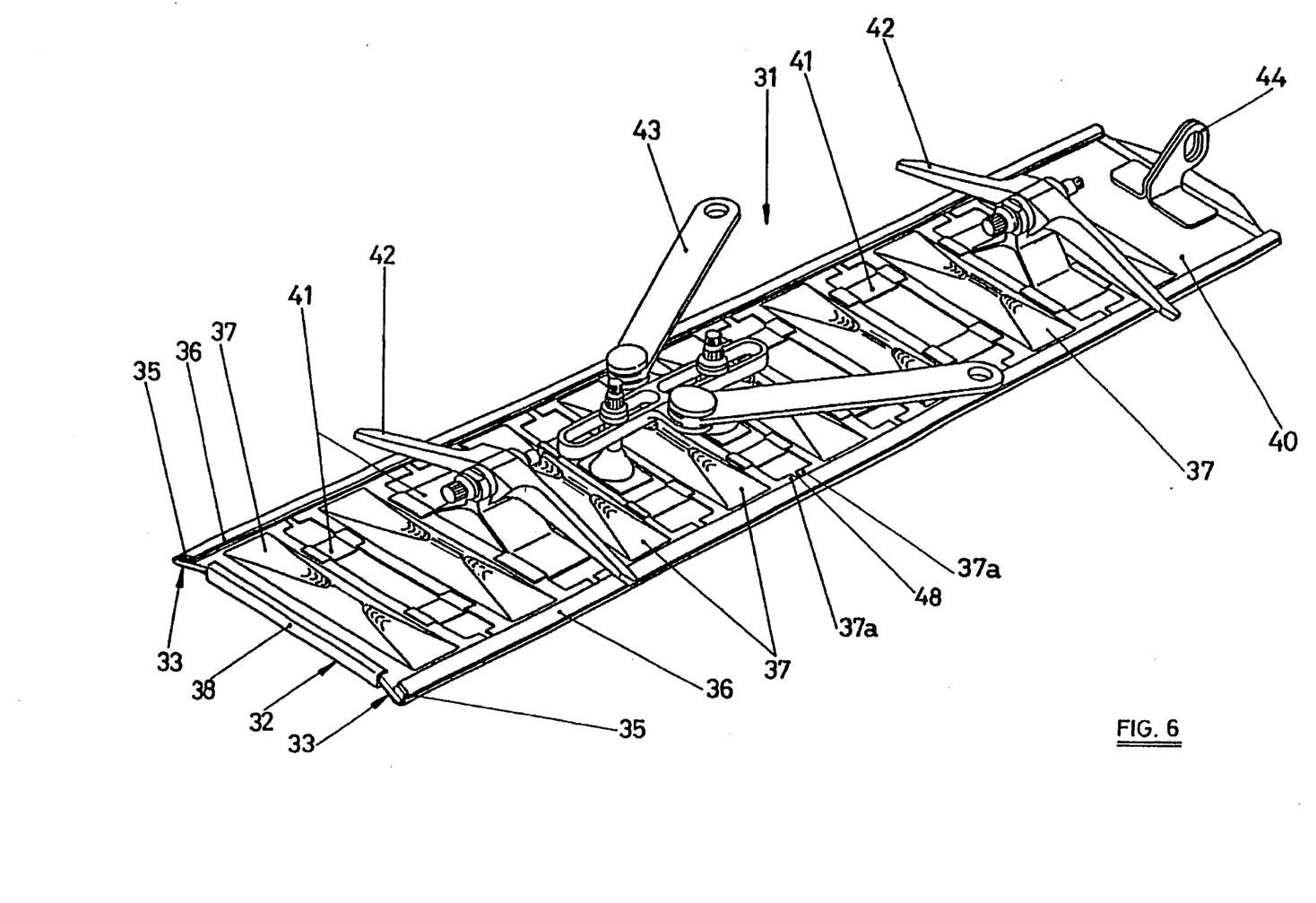
FIG. 6 is a rear perspective view of a divergent slave petal according to the invention.
Figure 7:
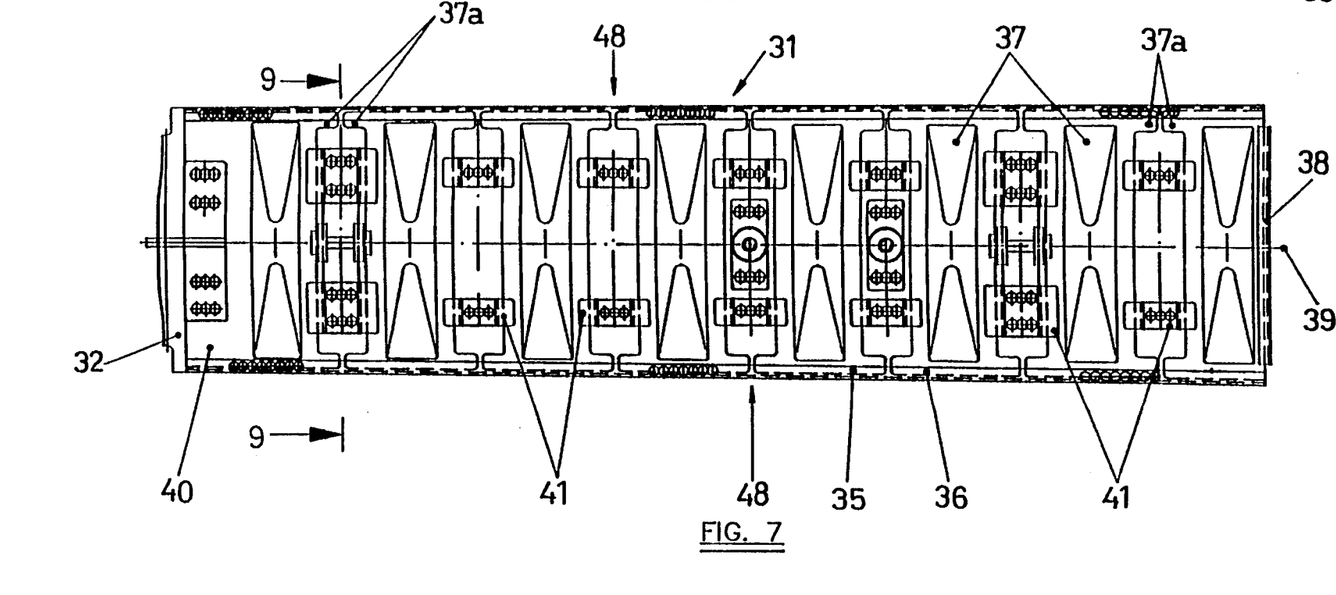
FIG. 7 is a plan view of the divergent slave petal of FIG. 6.
Figure 8:
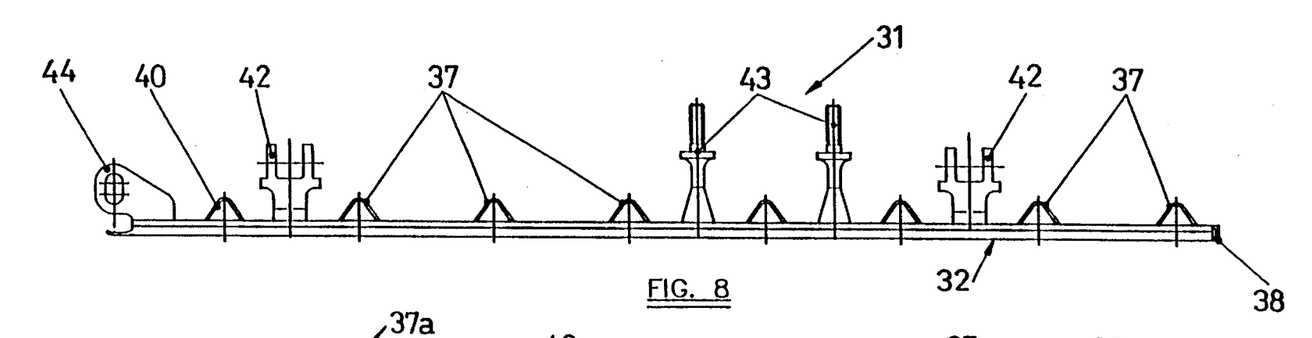
FIG. 8 is a side elevation of the divergent slave petal of FIG. 6.
Figure 9:
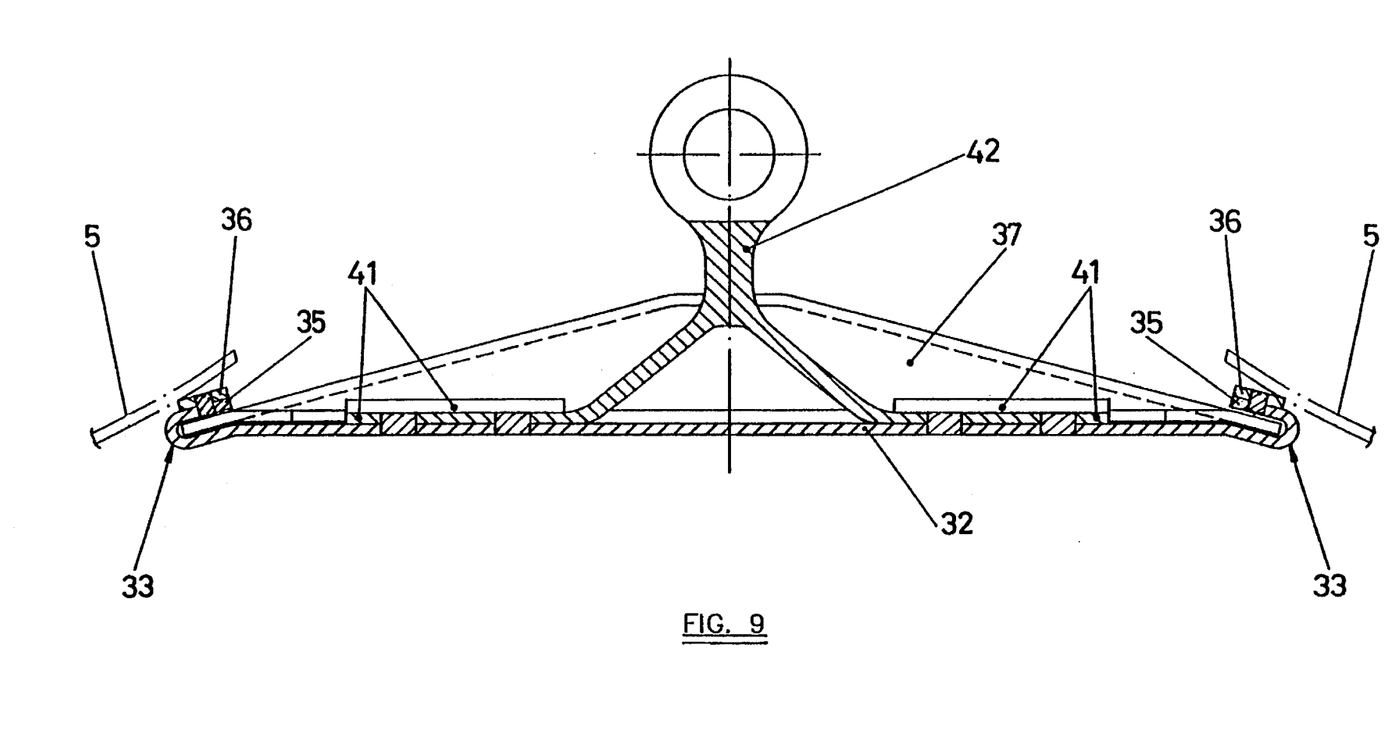
FIG. 9 is a cross section, on a larger scale, along the section 9—9 of FIG. 7.

In FIGS. 6 to 9, there is shown one of the embodiments of the slave petals 31 set forth in said patent application, formed of:

A base plate 32 bearing the axial forces coming from both the flow of gas and of cooling air and the inertia forces. In this embodiment, the base plate 32 which bears the axial forces has, on each of its longitudinal edges, continuous marginal folds of opposite direction of fold which define, on each side, a groove 33 provided in a longitudinal wing 35 parallel to the inner surface of the contiguous divergent master petal 5 and forming a single element with the plate 32 bearing the axial forces. The longitudinal wing 35 can be reinforced, as can be noted better in FIG. 9, by a rim 36, also longitudinal, which provides a seat for the inner surface of the contiguous divergent master petal 5. The base plate 32 is further provided on its free, transverse edge with a transverse closure lip 38 (FIG. 6).

An assembly of discrete transverse elements 37 which, being transmitters of the transverse forces and of the shearing forces imposed both by the flow of gas and by the movements of the contiguous divergent master petal 5, have no ability to transmit torsion movements around the longitudinal axis 39 of the divergent slave petal since they are permitted a certain relative movement between them and with the base plate 32.

A discrete transverse element 40 for connection with the convergent slave petal, welded to the upstream end of the base plate 32.

An assembly of clips 41 which connect the base plate 32 to the discrete transverse elements 37, permitting a certain relative movement between them.

The customary support and guide systems formed by spars 42 which engage the divergent master petal 5, by a centering mechanism 43 and sliding degenerated cylindrical articulation 44 for connecting the divergent slave petal 31 to the corresponding convergent slave petal 30, as shown in FIG. 5.

All of these customary support and guide systems 42, 43 and 44 are connected to the base plate 32.

These customary support and guide systems 42, 43 and 44 are shown by way of example, it being possible to use other conventional systems (for instance, a duplicate centering mechanism 43 instead of the sliding degenerated cylindrical articulation 44). The sliding degenerated cylindrical articulation 44 permits the divergent slave petal 31 to sit on the inner surface of the contiguous divergent master petal 5 and also permits the entire divergent slave petal 31 to turn through a certain angle in any direction centered on the sliding degenerated articulation 44, so that the divergent slave petal 31 adopts the positions which are imposed upon it by the contiguous divergent master petal 5 through the centering mechanism 43. The sliding degenerated cylindrical articulation 44 is of customary use in conventional axisymmetric convergent-divergent nozzles of variable geometry (not orientable) at present under development or in operation.

Since there is no physical continuity between the discrete transverse elements 37 and the base plate 32, nor between the contiguous discrete transverse elements 37, the presence of heat gradients, both longitudinal and transverse, does not generate any thermal force in the divergent slave petal 31, since nothing limits the movements of thermal expansion of the base plate 32 nor those of each of the discrete transverse elements 37.

Furthermore, and since the thickness of the base plate 32 is the minimum necessary to transmit the axial forces (or small magnitude) to the corresponding convergent slave petal 30 and, at the same time, to save the spaces present between every two discrete transverse elements 37 or 37 and 40 (when the pressure on the inner surface of the divergent slave petal 31 is greater than the pressure on its outer surface), the divergent slave petal 31 constitutes a unit of reduced stiffness to torsion, since the discrete transverse elements 37 cannot transmit it. In this way, the divergent slave petal 31 has flexibility to distort in order to cover the space between contiguous divergent master petals 5 during the orientation of the flow, without there taking place, due to this, the destruction by fatigue of the material, it therefore being possible to prolong the operating life of the petal.

Figure 10:
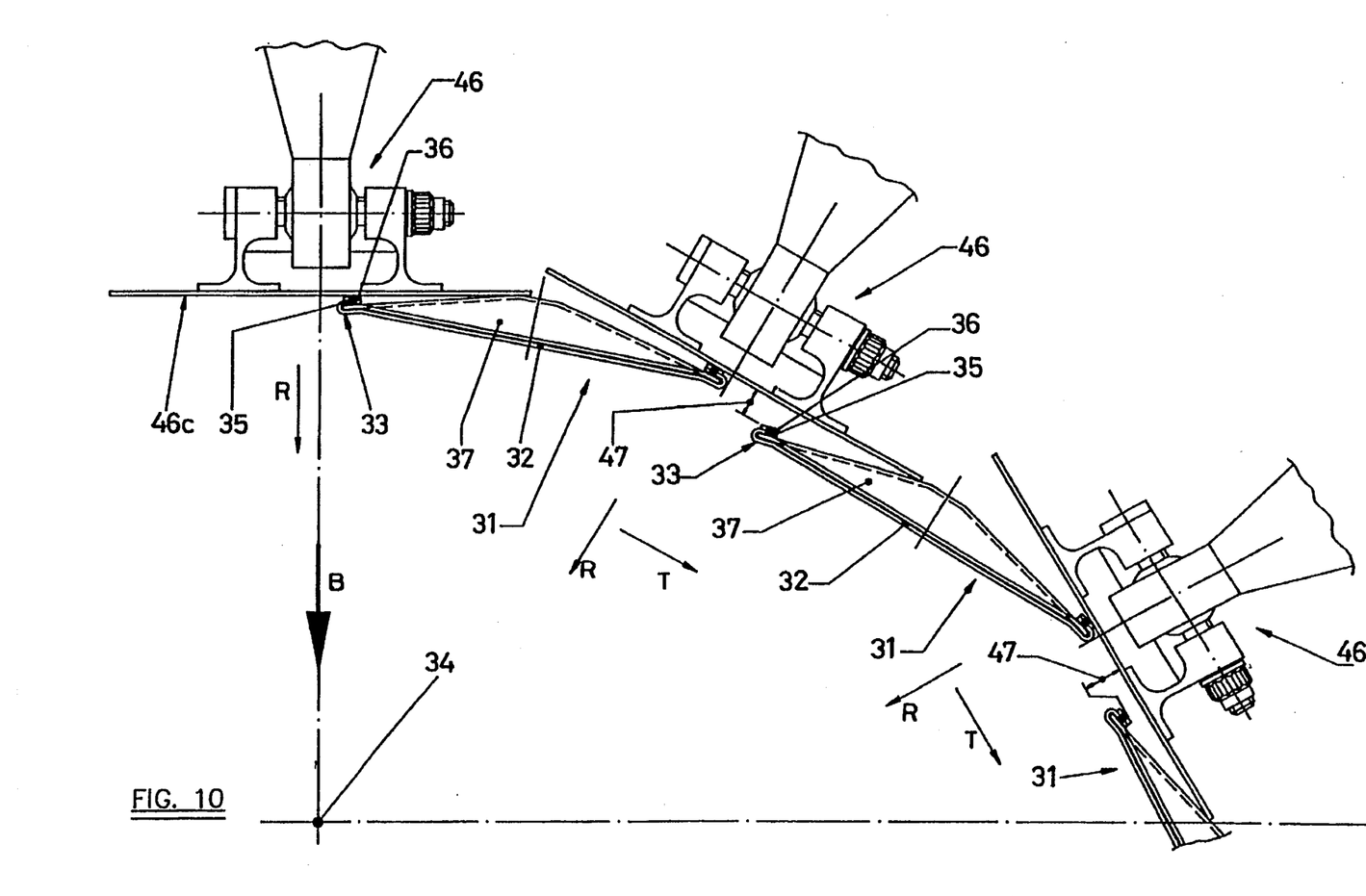
FIG. 10 is a partial cross section through the nozzle along the section line 10—10 of FIG. 4, with the nozzle in closed position and orienting the flow, and in which the inner surface of the divergent master petals is flat.
Figure 11:
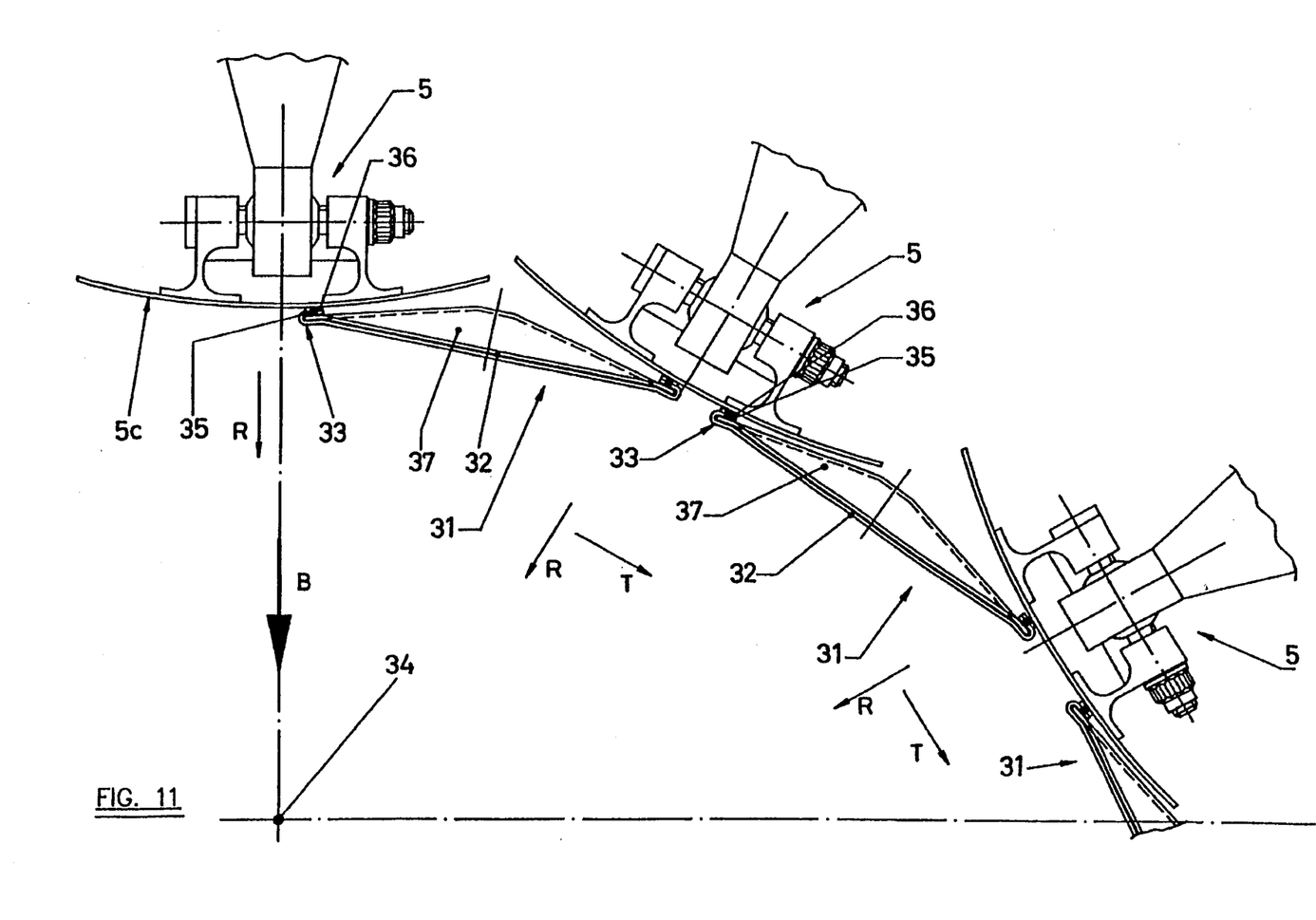
FIG. 11 is a partial cross section through the nozzle along the section line 10—10 of FIG. 4, with the nozzle in closed position and orienting the flow, and with the divergent master petals of the invention.

In FIGS. 10 and 11, as previously indicated, there is shown a partial cross section through the nozzle in a zone near the A9 exit area 49. In those figures, the nozzle is shown in closed position, with orientation of the flow.

FIG. 10 shows a divergent master petal 46, the inner surface 46c of which is substantially flat, in order to show the interference problems which are produced, during orientation of the flow, between the inner surface and the discrete transverse elements 37 of the divergent slave petal 31 shown in FIGS. 6 to 9. This presupposes that one of the longitudinal edges 33 of the base plate 32 does not sit on the inner surface 46c of the divergent master petal 46, leaving a longitudinal opening 47, FIG. 10, which permits the passage of the gases to the outside.

The divergent master petal 46 of FIG. 10 is substantially identical in its configuration to the divergent master petal 5 of the rest of the figures, with the sole exception that its inner surface is flat.

There are two solutions for solving this problem:

To adopt for the divergent slave petal 31 a base plate 32 having a basically straight cross section in the zone of the A8 throat area 15 and a curved cross section convex with respect to the axis of the engine 34 in the zone of the A9 exit area 49, in order to have sufficient space so that the discrete transverse elements 47 do not interfere with the inner surface 46c of the divergent master petal 46 and have sufficient capacity to transmit the transverse and shearing forces imposed by the flow of gas and the divergent master petals 46. However, to adopt for the base plate the shape described presupposes considerably increasing its stiffness to torsion and longitudinal flexure, thereby greatly reducing its ability to adapt itself to the inner surface of the divergent master petal 46 in any situation, that is, the effectiveness of the seal in the divergent zone 3 of the nozzle is drastically reduced.

Figure 14:
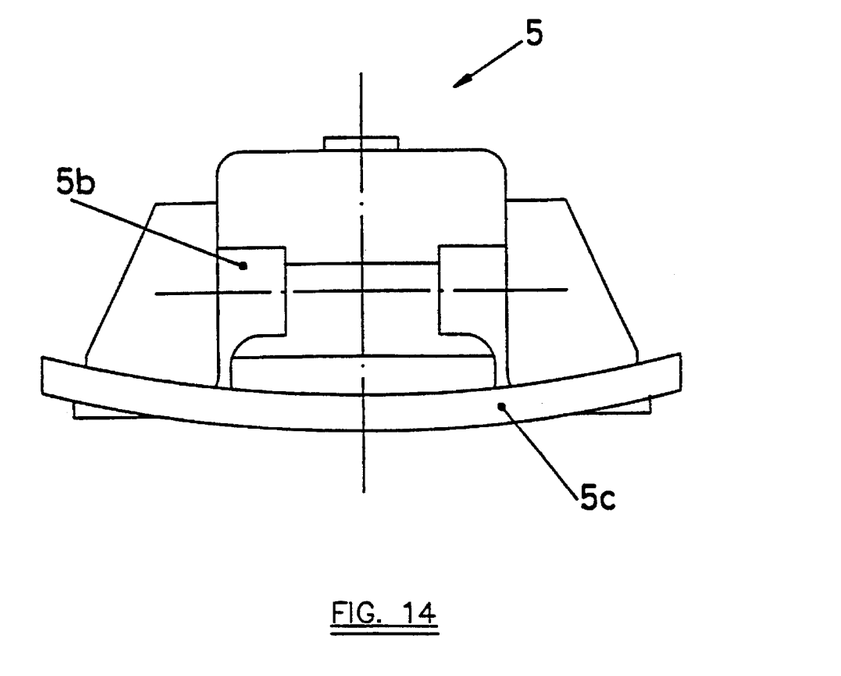
FIGS. 14 and 15 are front views of the divergent master petal along the directions indicated by the arrows 14—14 and 15—15 of FIG. 12 respectively.

To adopt for the divergent master petal 5, as shown in FIGS. 12 to 15, an inner surface 5c, in contact with the flow of gases, defined by a straight line along a section transverse to the longitudinal axis 45 of the master petal 5 at its upstream end, corresponding to the zone of the A8 throat area 15, and a curved line along a section transverse to the longitudinal axis 45 of the petal 5 at its downstream end, corresponding to the zone of the exit area A9 of the nozzle 49. As best seen in FIG. 14, the curved line is convex with respect to the central axis 34 of the engine.

In accordance with the present invention, this last solution makes it possible to eliminate the problem of interference between the discrete transverse elements 37 of the divergent slave petal 31 with the inner surface 5c of the divergent master petal 5 for the angles of orientation of the flow required in this type of nozzle.

Figure 15:
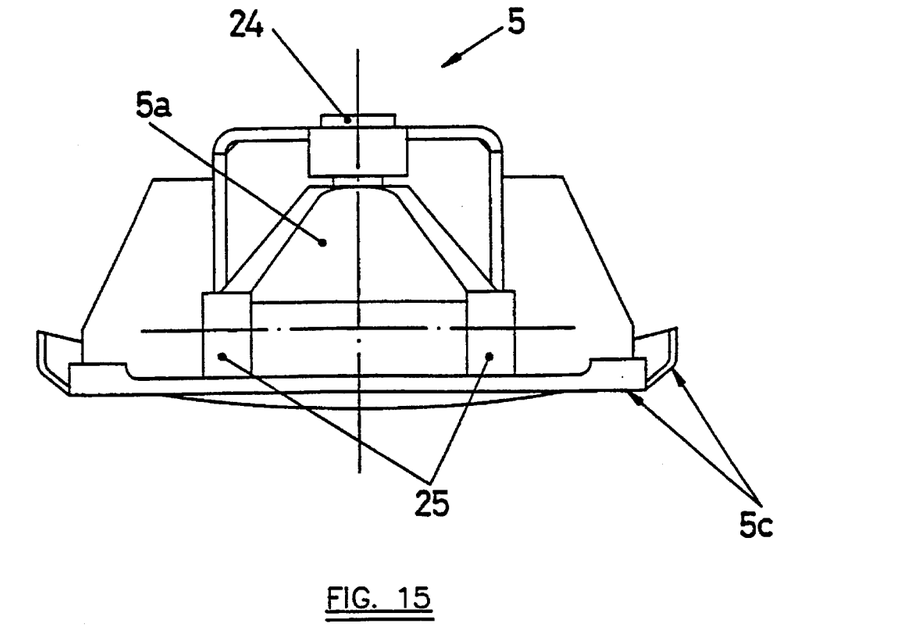

In FIGS. 14 and 15 there can be noted the shape adopted for the inner surface 5c of the divergent master petal 5 generally straight or flat in its upstream end, as shown in FIG. 15, and conversly curved in its downstream end, as shown in FIG. 14. The transition in longitudinal direction between the two ends takes place gently and progressively. The generally straight or flat shape of the upstream segment 5a coincides with or is close to the upstream transverse edge of the upstream segment 5a. The downstream segment 5b varies between a generally straight or flat cross section and a convexly curved cross section which coincide with or are close to an upstream and a downstream end, respectively, of the downstream segment 5b. The inner surface of the segment 5a could be flat or of variable shape, continuing the curvature of the inner surface of the segment 5b. It is clear that the shape described for the inner surface 5c can also be adopted in divergent master petals formed of a single segment instead of two segments 5a and 5b, being in each case connected at its upstream end to the convergent master petal 4 by means of a spherical articulation instead of the cylindrical articulation 25.

The features described, which are applicable to convergent-divergent nozzles of variable geometry which orient only the divergent zone make it possible to increase the maximum angle of orientation of the flow as compared with prior art nozzles, provided that divergent slave petals formed of structurally deformable units with minimum stiffness in torsion are used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A divergent master petal for a gas turbine orientable nozzle having convergent and divergent zones with ability to orient the flow of gas in the divergent zone of the nozzle, wherein the divergent master petal is connected to a convergent master petal and is in contact with the divergent slave petal, which constitute a structural unit which is deformable with minimum stiffness in torsion, the divergent master petal comprising:

a longitudinal rigid plate element having upstream and downstream transverse edges and an inner surface in contact with the flow of gas which is of a shape which is variable between a substantially straight cross section coinciding with or close to the upstream transverse edge and a convexly curved cross section coinciding with or close to the downstream transverse edge, with the convexity directed towards the inside of the nozzle.

2. A petal according to claim 1, wherein the rigid plate element comprises at least two segments, an upstream segment in which the upstream transverse edge is located and a downstream segment in which the downstream transverse edge is located, the upstream segment having an inner surface in contact with the flow of gases of generally flat shape and the downstream segment having a surface of gradual, continuous variable shape between a substantially straight cross section coinciding with or close to an upstream transverse end of said downstream segment and a convexly curved cross section coinciding with or close to said downstream transverse edge, with the convexity of the convexly shaped cross section being directed towards the inside of the nozzle.

3. A petal according to claim 2, wherein the generally flat shape of the upstream segment coincides with or is close to the upstream transverse edge of the upstream segment and the convexly curved cross section coincides with or is close to the downstream transverse edge of the downstream section.

4. A divergent master petal for a gas turbine orientable nozzle having convergent add divergent zones with ability to orient the flow of gas in the divergent zone of the nozzle, wherein the divergent master petal is connected to a convergent master petal and is in contact with the divergent slave petal, which constitute a structural unit which is deformable with minimum stiffness in torsion, the divergent master petal comprising:

a longitudinal rigid plate element having upstream and downstream transverse edges and an inner surface in contact with the flow of gas which is of a shape which is variable between a substantially straight cross section coinciding with or close to the upstream transverse edge and a convexly shaped cross section coinciding with or close to the downstream transverse edge, with the convexity directed towards the inside of the nozzle, rigid plate element comprises at least two segments, an upstream segment in which the upstream transverse edge is located and a downstream segment in which the downstream transverse edge is located, the upstream segment having an inner surface in contact with the flow of gases of generally flat shape and the downstream segment having a surface of gradual, continuous variable shape between a substantially straight cross section coinciding with or close to an upstream transverse end of said downstream segment and a convexly curved cross section coinciding with or close to said downstream transverse edge, with the convexity of the convexly shaped cross section being directed towards the inside of the nozzle; and a cylindrical articulation for connecting the upstream and downstream segments together.

\* \* \* \* \*